Aug. 26, 1969   J. B. THOMSON   3,463,049
MACHINE WORK HOLDING TABLE
Filed March 27, 1967   4 Sheets-Sheet 1

INVENTOR.
JOHN B. THOMSON
BY
MORGAN, FINNEGAN, DURHAM & PINE
ATTORNEYS

Aug. 26, 1969   J. B. THOMSON   3,463,049
MACHINE WORK HOLDING TABLE
Filed March 27, 1967   4 Sheets-Sheet 3

*INVENTOR.*
JOHN B. THOMSON
BY
MORGAN, FINNEGAN, DURHAM & PINE
ATTORNEYS

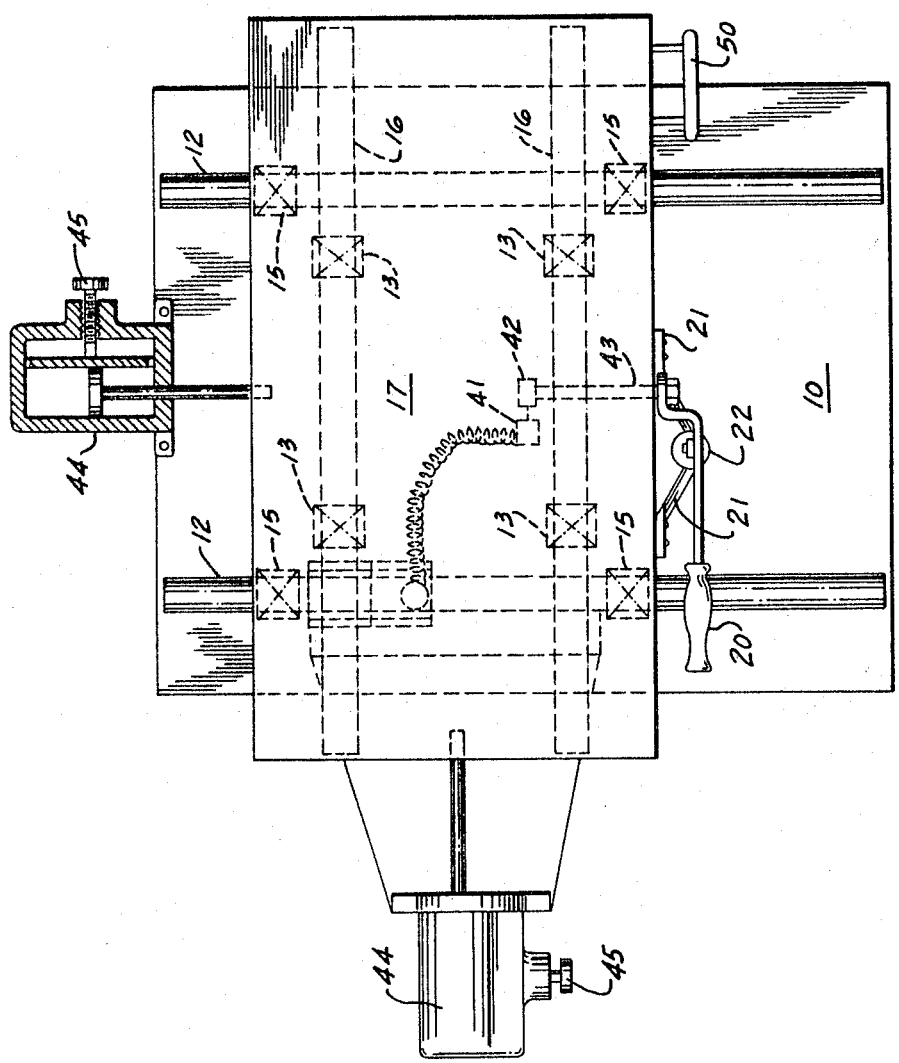

3,463,049
MACHINE WORK HOLDING TABLE
John B. Thomson, 1029 Plandome Road,
Manhasset, N.Y. 45216
Filed Mar. 27, 1967, Ser. No. 626,311
Int. Cl. B23d 7/08; B23b 47/28
U.S. Cl. 90—13                                    9 Claims

ABSTRACT OF THE DISCLOSURE

The present invention provides a hand propelled work holding table for use on machine tools, such as milling machines and drill presses. The work holding surface of the table is mounted on its base so as to move freely in any direction in one plane and is provided with a template engaging device whereby the work on the surface may be guided or located with respect to the cutting tool. Attachable and detachable weights are provided for lifting and clamping them to the work holding surface to stabilize the surface and the work hold thereon. Other stabilizing means may be provided, as adjustable dashpots actuated by movement of the work holding surface on the base member. Other means are provided for locking the surface against movement, as when drilling. The spindle of the machine tool preferably has a supplementary mass rotatable with it at high speed, the supplementary mass also generating a gyroscopic force to reduce vibration and chatter during the cutting operation.

SUMMARY OF THE INVENTION

This invention relates to hand propelled work holding tables for use on machine tools. Previously tables of this type have been used to position work for drilling, tapping, reaming and other machining operations where there is no relative horizontal motion between the work piece and the cutting tool during machining. By use of a locating template, these tables eliminate the cost and time required to fabricate box jigs which are otherwise used to locate the cutting tool with respect to the work. They also speed work location and increase tool life by eliminating the wear against the drill bushing. They are highly advantageous for small and medium production runs where hand layout would be impractical and the per piece amortization of the box fixture would be excessive. These work positioning tables can be used on an ordinary inexpensive drill press, as well as other machines, making it a semiautomated production machine.

The object of this invention is to obtain all of the above advantages and also to add to the work table the additional important capability of machining work in motion. This transforms a common low cost machine, such as a drill press, into a versatile dual purpose production machine. It is then a production drilling machine and also a production milling machine which can be switched rapidly from one function to the other during the processing of a part. In effect it makes two machines out of one with the further advantage that the part does not have to be reset for the second function as would be the case if two machines were used such as a drill press and a milling machine.

To do this a template containing both positioning holes and guiding surfaces is used to engage a retractable locating and guiding plunger. For stationary machining operations such as drilling, etc., it is desirable to have the mass of the hand-propelled work table as small as possible to minimize the effort required to overcome the inertial forces of acceleration and deceleration at each position which induce fatigue of the operator over a period of time. The necessity of this small mass makes it impractical to allow the light work table to float freely in the horizontal plane and do machining where there is relative horizontal motion between the cutting tool and the work piece. This is because it is hand propelled and the action of the cutting tool will set up severe vibration and chatter and sometimes throw the work piece and table to the extent that it will break the cutting tool.

This invention utilizes a template which can contain stationary locating holes as well as straight or curved linear grooves or edges which guide the work table when it is free floating. In combination with this, the invention uses a readily attachable and detachable mass which substantially increases the mass of the movable work surface. The added inertia of this mass during cuting in-motion makes it impossible for the action of the cutting tool to seriously vibrate, chatter, or throw the work piece and table. This permits the table to do many contour or straight cutting, grooving or slotting operations which greatly increases the versatility of the work table and turns a low cost drill press into a small and medium production milling machine in addition to a small and medium production drilling machine. During in-motion machining the work table moves slowly and at a constant speed and therefore there is no problem of operator fatigue from frequent acceleration and deceleration of a heavy mass. This highly versatile combination enables production of parts requiring both milling and drilling in one low cost setup. The mass which is essential for milling and undesirable for drilling is easily and quickly removed to eliminate the high inertial forces during the positioning operations for stationary machining.

THE DRAWINGS

FIGURE 5 is a top plan view of a modified embodiment of the invention.

DETAILED DESCRIPTION

Figure 1:
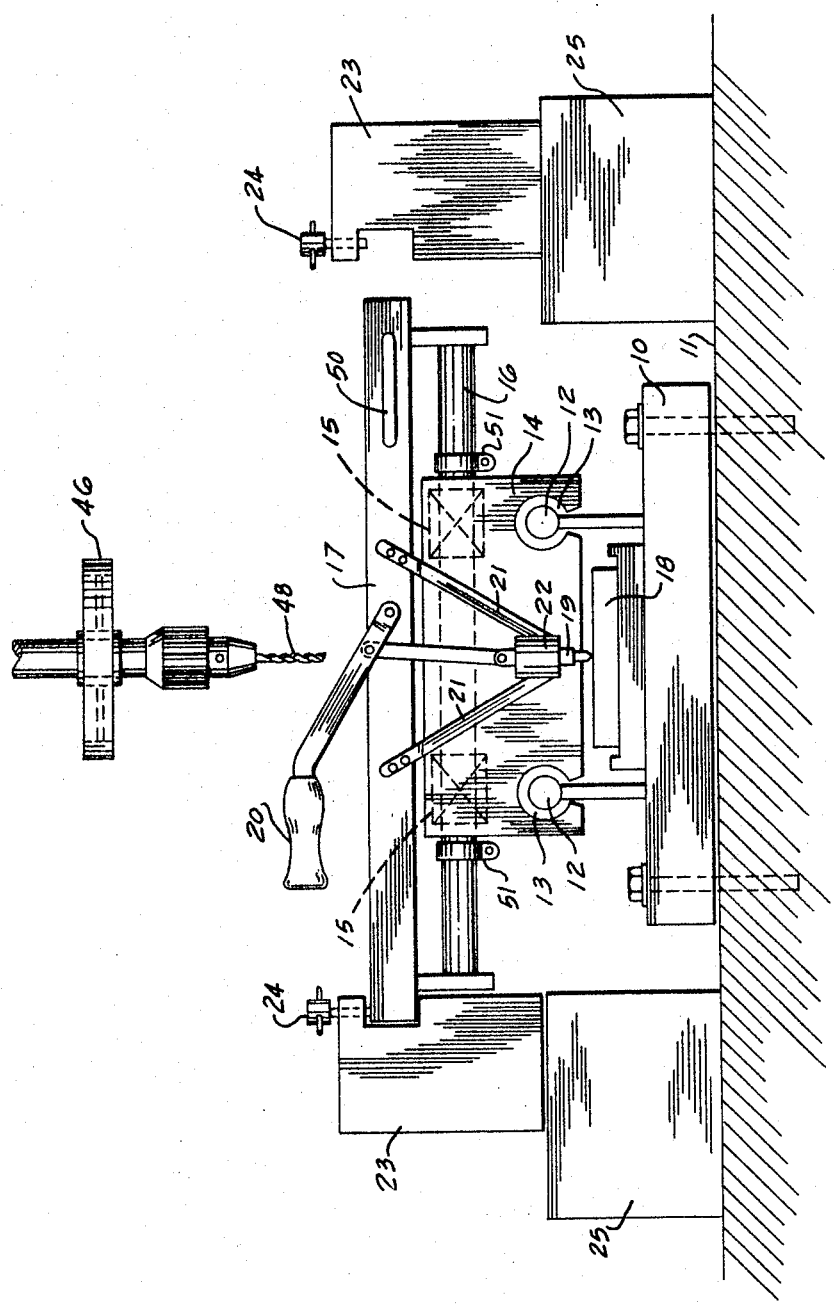
FIGURE 1 is a side elevation of a work positioning table in accordance with the present invention.

A base plate 10 is attached to the table 11 of a drill press, or other machine. The base supports two parallel shafts 12 on which are mounted four linear motion bearings 13, preferably of the antifriction type, which support saddle member 14 which in turn supports linear bearings 15 which guide two parallel shafts 16 which are positioned at 90° with respect to shafts 12. Shafts 16 support work table 17 which is free to move in any direction in one plane on the aforementioned linear bearing unless it is otherwise held in position. The base 10 also supports a template 18 which may be provided with holes and contoured or straight guiding grooves or linear edge surfaces which are engaged by plunger or other engaging device 19 when depressed by handle 20. Plunger 19 is guided for vertical movement and held against horizontal movement with respect to work table 17 by means of a sleeve 22 which is rigidly fastened to work table 17 by means of brackets 21.

Relatively large masses 23 are provided which can be readily attached and detached from the work table by the hand screws 24. For attachment of the mass, the hand screws 24 lift each of the masses 23 sufficiently to clear its platform 25 and clamp the mass to the end of the work table. Conversely, the hand screws may lower the mass to its platform 25 and free the table to travel unweighted between the openings in the mass. For simplicity of illustration hand screws are shown, but if desired quick acting lever action clamps may be substituted. The relatively effortless and rapid attachment and detachment of the masses is important when frequent switching from stationary to in-motion machining is required.

The locating holes 26 in the template 18 are for stationary machining or drilling and 27 indicates one of the contours in the template 18 which guide the free floating work table during in-motion machining by engagement with the plunger 19.

Figure 4:
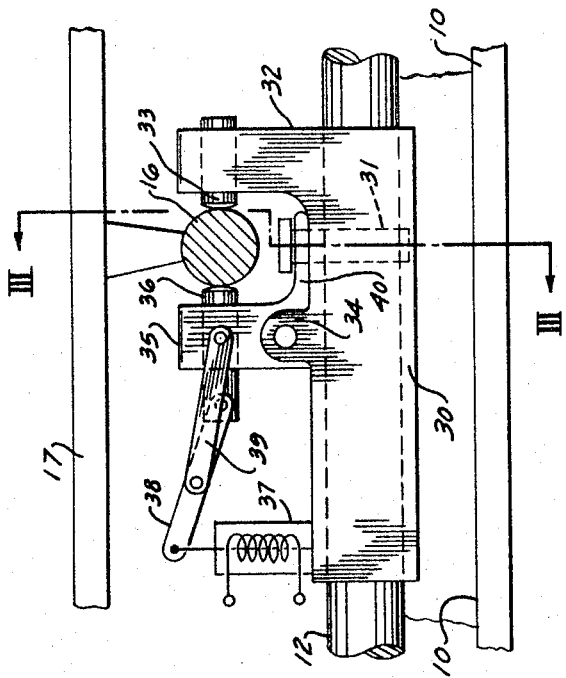
FIGURE 4 is a similar cross-sectional view taken at right angles to the view of FIGURE 3.
Figure 3:
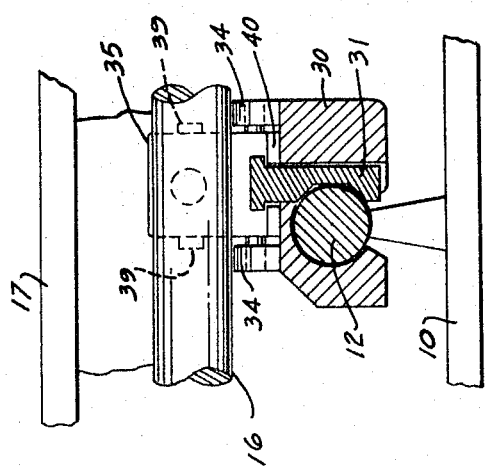
FIGURE 3 is a vertical cross-sectional view of a clamping means which is preferably used, taken on the line III—III of FIGURE 4.

FIGURES 3 and 4 are different sectional views of a clamp using a unique toggle action which locks the table 17 simultaneously in both planes when activated by depressing handle 20.

A sleeve-like carrier member 30 is normally slidable on one of the shafts 12 and is provided with a vertically movable clamping wedge 31 which is formed as a grooved pin freely movable in an aperture formed in the carrier member 30. The grooved wedge 31 normally has some clearance with respect to shaft 12, but as the wedge 31 is moved upwardly the grooved portion tightly engages the side of shaft 12 so as to prevent relative movement between the carrier member 30 and shaft 12. Means are also provided for clamping the carrier 30 with respect to shaft 16 so as to prevent relative movement between the carrier 30 and shaft 16, thereby immobilizing the table 17 with respect to its base member. As embodied, carrier 30 is provided with an upright portion 32 which carries a jaw member 33 normally having a minute clearance with shaft 16. Carrier 30 is also formed with a pair of bases 34 between which is pivotally mounted a bell crank 35 carrying a second and slidably mounted jaw member 36 which normally rests lightly against shaft 16. The clamping member for shaft 16 is actuated by means of a solenoid 37 which serves to pull down the outer end of lever 38 pivotally mounted on the outer end of jaw member 36. A pair of link members 39, one at either side of bell crank 35 are pivotally mounted on the bell crank 35 and are also pivotally connected to lever 38 to form a toggle, so that as lever 38 is pulled down, jaw member 36 is forcefully pushed against shaft 16 to clamp the carrier member 30 to shaft 16.

The lower end 40 of bell crank 35 is provided with an aperture to fit over the upper end of wedge pin 31 so as to lift it by the enlarged head of pin 31, as jaw 36 is forced against shaft 16.

Supply of current to solenoid 37 is controlled by switch 41 which is actuated by a cam 42 on the inner end of the shaft 43 by which handle 20 is pivotally mounted, switch 41 and solenoid 37 being supplied with electric power and interconnected by suitable flexible conductors.

When solenoid 37 is denergized the pressure against shafts 12 and 16 is released and table 7 is again free to move in all horizontal directions.

FIGURE 5 illustrates a modified embodiment of the invention in which adjustable dash pots 44 are provided to supplement the masses 23 (not shown in FIGURE 5). One of the dashpots 44 is mounted on base member 10 and has its piston connected to the support saddle member 14, while the other dashpot is mounted on the member 14 and has its piston connected to table 17.

To further smooth out machining chatter and vibrations due to the action of its mass, providing linear inertial, rotational inertial and gyroscopic action, a disk 46 is clamped to the rotating spindle of the machining tool.

In operation the template 18 for the piece to be produced is positioned against a known reference point in the base 10 and clamped down. The workpiece is clamped against a known reference point on the top of table 17 underneath the cutting tool 48 of the machine. If the cutting operation passes through the workpiece a protective plate is usually put under the workpiece to prevent damage to the top of the work table. With the mass removed as shown by the right-hand side of FIGURE 1, the low mass table is freely moved by handles 20 and 50 with handle 20 in the up position until the plunger 19 is in register with one of the holes such as 26. Handle 20 is then depressed which positions the workpiece and preferably simultaneously actuates the clamps of FIGURES 3 and 4 within saddle 14 which securely locks the work table in the proper position.

Figure 2:
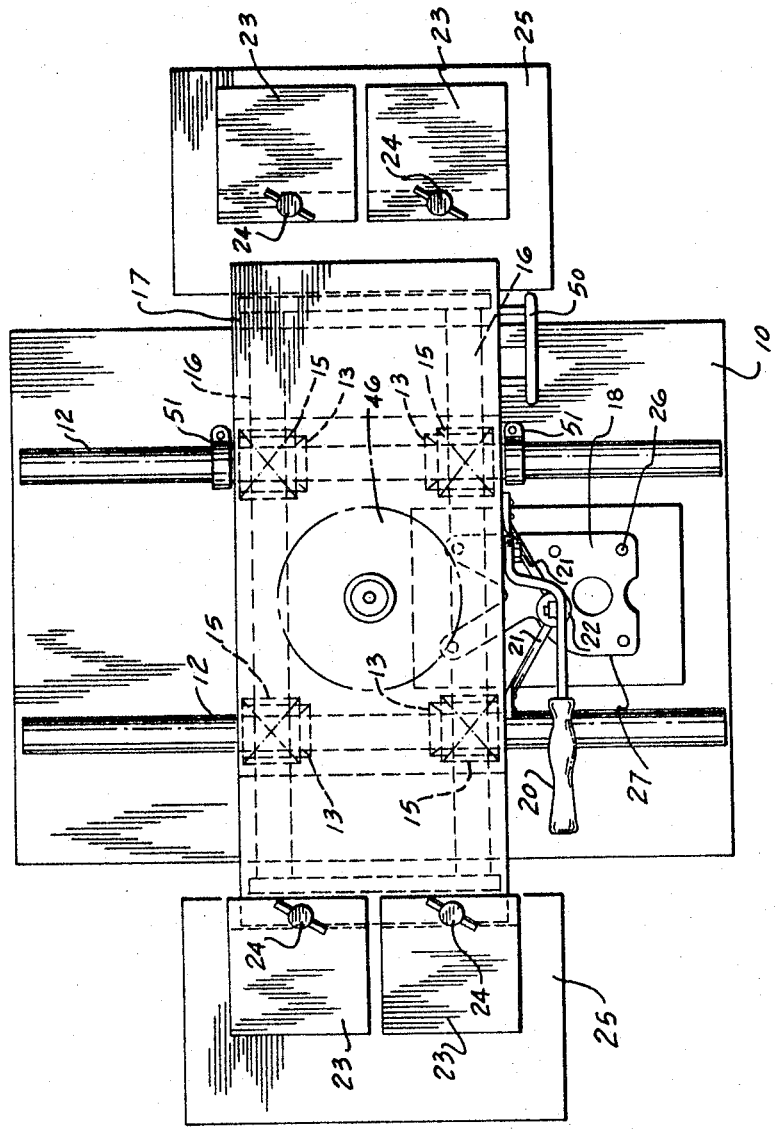
FIGURE 2 is a plan view of the embodiment shown in FIGURE 1.

Separate locks are provided for each axis for straight line machining, as shown by split collars 51 in FIGURES 1 and 2. After the drilling, or other stationary machining is finished, the handle 20 is raised which releases the clamp and disengages the plunger from hole 26. The process is repeated for each of the holes in the part. Then a suitable number of weights 23 for the particular job are attached and secured by hand screws 24. The clamp mechanism is disengaged. A suitable milling-type tool is substituted at 48 and the machine is adjusted for the desired depth of cut. By gripping handle 20 with the left hand and handle 50 with the right hand the operator then guides the high mass table around the various contours such as 27 of template 18 and the part is complete. Depending on the number of pieces to be produced and the nature of the part it may be more economical to do all of the stationary operations for the entire run and then reset the workpiece for all of the in-motion machining. This would depend on the time and energy required to reset the workpiece as compared to attaching the necessary mass and tool changing.

FIGURE 2 shows a total mass comprising four weights 23 which could be approximately 50 pounds each and therefore readily handled by one man for a total mass addition of about 200 pounds. For some light in-motion machining attachment of all four weights may not be necessary.

What I claim is:

1. A hand propelled work holding table for stationary and in-motion machining on machine tools comprising a fixed base, a work holding surface movable in all directions in one plane, an engaging device, a template to control the motion of the holding surface by engagement with the engaging device, said template having linear surfaces to guide the motion of the holding surface, and an attachable and detachable weight of substantial mass for attachment during machining operations requiring motion of the work holding surface.

2. A work holding table as claimed in claim 1 wherein a plurality of weights are used to obtain the minimum required mass and reduce the effort required for attachment and detachment of the mass.

3. A work holding table as claimed in claim 1 wherein there are clamping means actuated by the engaging means engagement with the locating template.

4. The work table as claimed in claim 1 provided with mass attaching means which both lift and clamp the mass to the work table.

5. The work table as claimed in claim 1 wherein dashpots are attached to the work table to supplement the mass.

6. A hand propelled work holding table for stationary and in-motion machining on machine tools comprising a fixed base, a work holding surface movable in all directions in one plane, an engaging device, a template to locate and alternatively to guide the motion of the holding surface by engagement with the engaging device, said template having linear surfaces to guide the motion of the holding surface and holes to locate the holding surface and a mass attached to the spindle of the machine tool, said mass providing linear and rotary inertial forces thereby reducing vibration and chatter in the combined machine tool and work table.

7. The combination claimed in claim 6 wherein the mass is shaped to generate gyroscopic forces to further resist vibration and chatter.

8. A hand propelled work holding table for stationary and in-motion machining on machine tools comprising a fixed base, a work holding surface movable in all directions in one plane, an engaging device, a template to locate or guide the motion of the holding surface by engagement with the engaging device, said template having linear surfaces to guide the motion of the holding surface, and dashpots attached to the work table to resist chatter and vibration in both the longitudinal and transverse axes.

9. The work table claimed in claim 8 wherein the dashpots are adjustable to vary their resistance to motion.

References Cited

UNITED STATES PATENTS

| | | | |
|---|---|---|---|
| 1,620,522 | 3/1927 | Dalton | 90—58 |
| 2,050,347 | 8/1936 | Lochman | 90—58 |
| 2,409,903 | 10/1946 | Schwartz | 90—13.2 |
| 2,816,465 | 12/1957 | Honnef | 77—64 |
| 2,923,179 | 2/1960 | Pierce | 77—64 |
| 2,933,022 | 4/1960 | Stark | 90—58 |
| 3,106,110 | 10/1963 | Senn | 77—63 |
| 3,163,057 | 12/1964 | Drummond et al. | 77—64 |
| 3,183,780 | 5/1965 | Little | 90—13.2 |
| 3,240,085 | 3/1966 | Eppler | 77—64 |
| 3,266,343 | 8/1966 | Jellig | 77—64 |

GERALD A. DOST, Primary Examiner

U.S. Cl. X.R.

77—64; 90—58; 144—145